(12) United States Patent
Yamaguchi et al.

(10) Patent No.: US 11,273,821 B2
(45) Date of Patent: Mar. 15, 2022

(54) PARKING ASSISTANCE METHOD AND PARKING ASSISTANCE DEVICE

(71) Applicants: Nissan Motor Co., Ltd., Yokohama (JP); Renault S.A.S., Boulogne-Billancourt (FR)

(72) Inventors: Ichiro Yamaguchi, Kanagawa (JP); Yasuhisa Hayakawa, Kanagawa (JP); Takahiko Oki, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 55 days.

(21) Appl. No.: 16/341,282

(22) PCT Filed: Oct. 13, 2016

(86) PCT No.: PCT/JP2016/080386
§ 371 (c)(1),
(2) Date: Apr. 11, 2019

(87) PCT Pub. No.: WO2018/070021
PCT Pub. Date: Apr. 19, 2018

(65) Prior Publication Data
US 2020/0017099 A1 Jan. 16, 2020

(51) Int. Cl.
*B60W 30/06* (2006.01)
*B60W 50/10* (2012.01)
*G05D 1/00* (2006.01)

(52) U.S. Cl.
CPC ............ *B60W 30/06* (2013.01); *B60W 50/10* (2013.01); *G05D 1/0088* (2013.01); *B60W 2554/00* (2020.02); *G05D 2201/0213* (2013.01)

(58) Field of Classification Search
CPC .. B60W 30/06; B60W 50/10; B60W 2554/00; G05D 1/0088; G05D 2201/0213
See application file for complete search history.

(56) References Cited

U.S. PATENT DOCUMENTS

2013/0035821 A1 2/2013 Bonne et al.
2015/0088360 A1* 3/2015 Bonnet .................. B60W 30/06
701/23

(Continued)

FOREIGN PATENT DOCUMENTS

JP H11-157404 A 6/1999
JP 2002-240661 A 8/2002

(Continued)

*Primary Examiner* — Hunter B Lonsberry
*Assistant Examiner* — Elizabeth Yang
(74) *Attorney, Agent, or Firm* — Young Basile Hanlon & MacFarlane, P.C.

(57) ABSTRACT

Provided is a parking assistance method capable of storing surrounding situation of a parking target position appropriate to be referred to during autonomous parking. The parking assistance method of storing the surrounding situation of the parking target position when parking at the parking target position and executing the autonomous parking using the stored surrounding situation, includes a step of detecting the surrounding situation; a step of indicating the detected surrounding situation; a step of receiving a determination of whether the indicated surrounding situation are appropriate input by an occupant; and a step of storing the surrounding situation when the determination of appropriateness is input by the occupant.

13 Claims, 11 Drawing Sheets

(56) References Cited

U.S. PATENT DOCUMENTS

| | | | | |
|---|---|---|---|---|
| 2015/0367845 A1* | 12/2015 | Sannodo | ............... | B60W 30/08 |
| | | | | 701/23 |
| 2016/0068158 A1* | 3/2016 | Elwart | .................. | B60W 50/10 |
| | | | | 701/41 |
| 2016/0139255 A1* | 5/2016 | Bueschenfeld | ......... | G01S 13/89 |
| | | | | 342/146 |
| 2016/0355178 A1* | 12/2016 | Shiraishi | ............ | B62D 15/0285 |
| 2018/0043884 A1* | 2/2018 | Johnson | .............. | B60W 10/184 |
| 2018/0099661 A1* | 4/2018 | Bae | .................... | B62D 15/0285 |
| 2018/0299900 A1* | 10/2018 | Bae | .................... | G06K 9/00805 |
| 2019/0096261 A1* | 3/2019 | Hayashi | .................... | B60R 1/00 |

FOREIGN PATENT DOCUMENTS

| | | |
|---|---|---|
| JP | 2005-326944 A | 11/2005 |
| JP | 2006-298115 A | 11/2006 |
| JP | 2007-055378 A | 3/2007 |
| JP | 2007-315956 A | 12/2007 |
| JP | 2013-244852 A | 12/2013 |
| WO | 2006/064544 A1 | 6/2006 |

\* cited by examiner

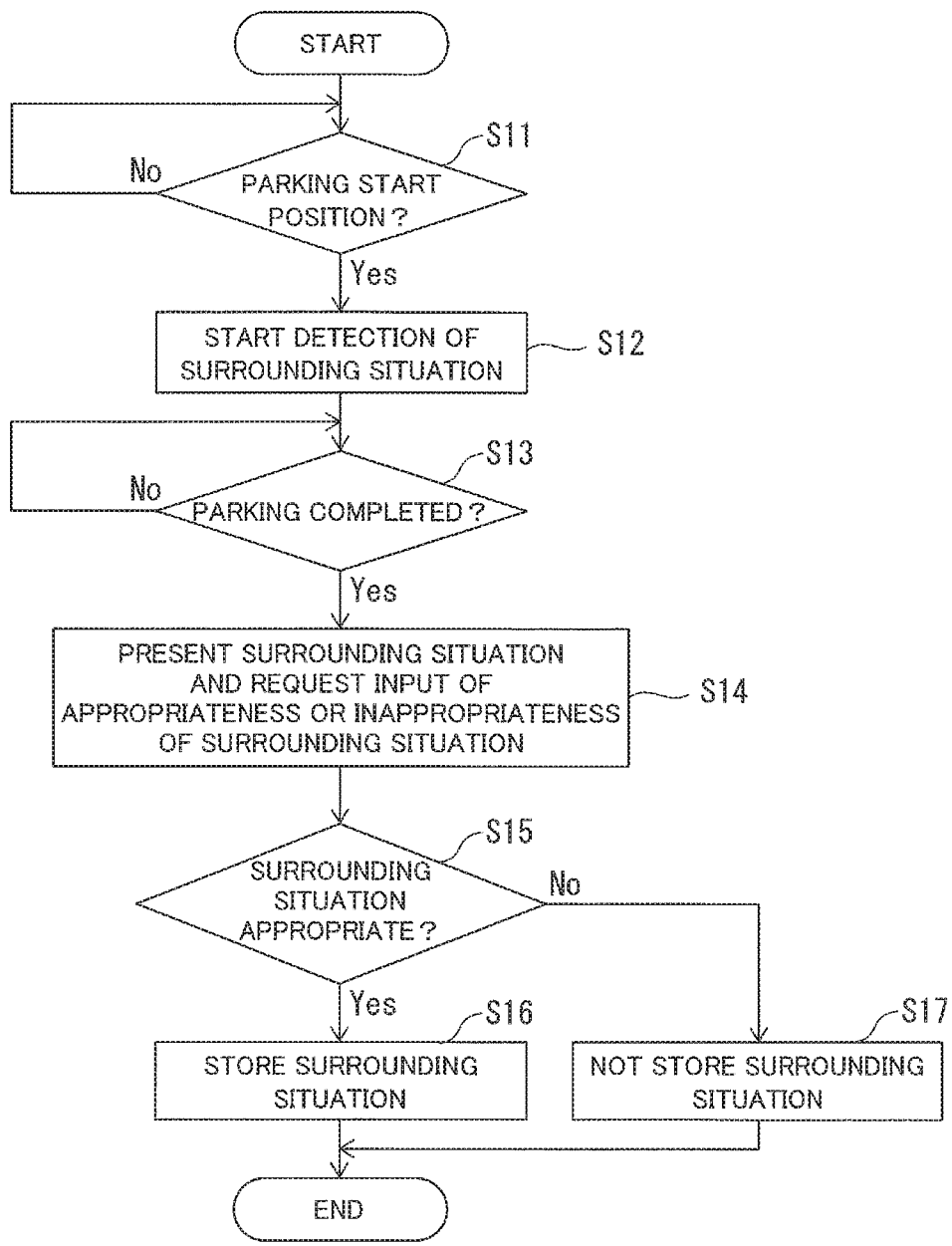

PARKING ASSISTANCE METHOD AND PARKING ASSISTANCE DEVICE

TECHNICAL FIELD

The present invention relates to a parking assistance method and a parking assistance device for executing autonomous parking.

BACKGROUND

Methods are known to detect the environment around a laser distance sensor several times while moving the laser distance sensor, and synthesize results of detected values so as to generate a map of the environment as an image (refer to JP 2005-326944 A).

When surrounding situation at a parking target position during parking are detected and stored so as to be referred to during autonomous parking, surrounding situation not appropriate to be referred to may also be stored by the method disclosed in JP 2005-326944 A depending on parking circumstances.

SUMMARY

In view of the foregoing problem, the present invention provides a parking assistance method and a parking assistance device capable of storing surrounding situation at a parking target position appropriate to be referred to during autonomous parking.

An aspect of the present invention provides a parking assistance method and a parking assistance device of storing a surrounding situation of a parking target position to be referred to when executing autonomous parking at the parking target position. The method and device detect the surrounding situation of the parking target position and presents the detected surrounding situation to an occupant. The method and device receive a determination of whether the presented surrounding situation is appropriate input by the occupant, and store the surrounding situation when the determination of appropriateness is input by the occupant.

BRIEF DESCRIPTION OF DRAWINGS

FIG. 5 is a flowchart illustrating a parking assistance method according to the first embodiment of the present invention;

DETAILED DESCRIPTION

Figure 1:
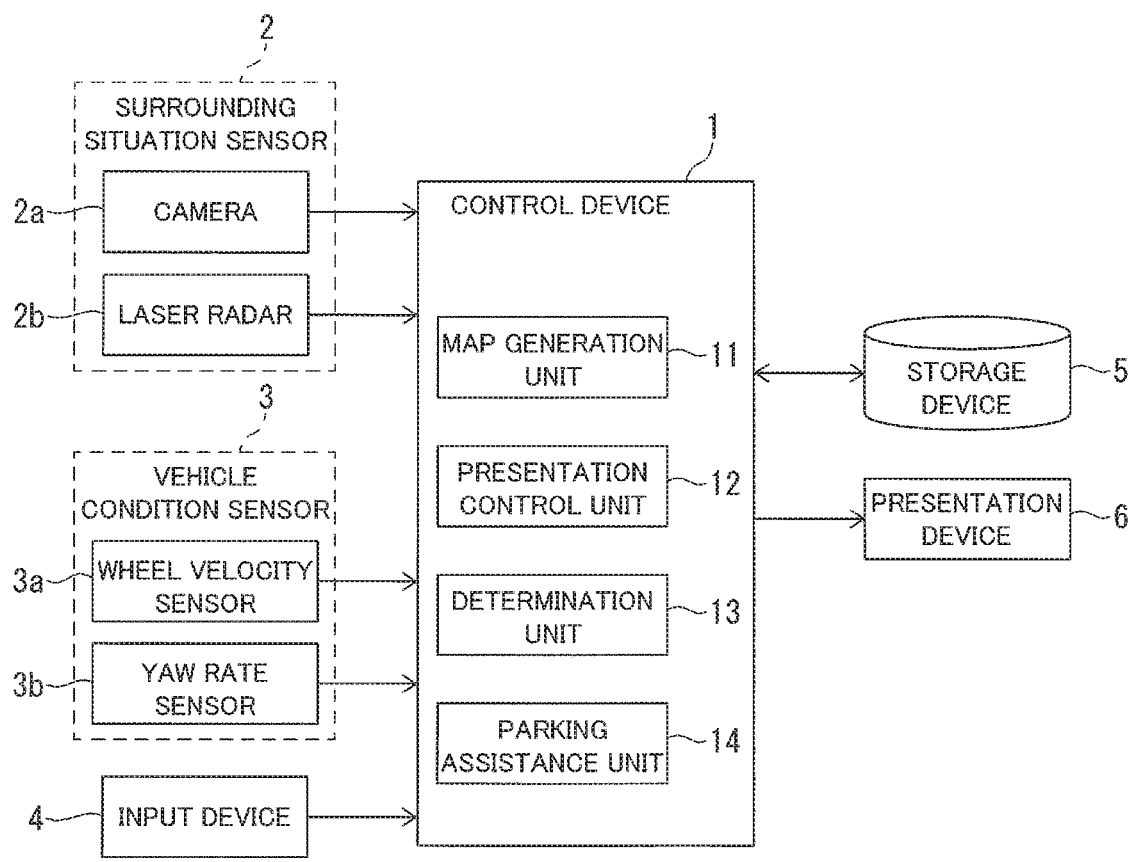
FIG. 1 is a block diagram illustrating a parking assistance device according to a first embodiment of the present invention.

Hereinafter, first and second embodiments according to the present invention will be described with reference to the Drawings. In the descriptions of the Drawings below, the same or similar elements are indicated by the same or similar reference numerals. It should be understood that the Drawings are illustrated schematically, and relationships of thicknesses and planar dimensions, and proportions of the respective thicknesses are not drawn to scale. It also should be understood that the relationships or proportions of the dimensions between the respective Drawings may differ from each other. The first and second embodiments described below illustrate a device and a method for embodying the technical ideas of the present invention, and the technical ideas of the present invention are not intended to be limited to the materials, shapes, structures, or arrangements of the elements as described herein. The technical ideas of the present invention are to cover various modifications falling within the scope of the invention as defined by the following appended claims.

A parking assistance device according to the first embodiment of the present invention can be installed in a vehicle (hereinafter, a vehicle equipped with the parking assistance device according to the first embodiment of the present invention is referred to as a "host vehicle"). The parking assistance device according to the first embodiment of the present invention includes a control device (controller) 1, a surrounding situation sensor 2, a vehicle condition sensor 3, an input device (interface) 4, a storage device 5, and a presentation device 6, as illustrated in FIG. 1.

The surrounding situation sensor 2 detects surrounding situation around the host vehicle including front situation, rear situation, and side situation of the host vehicle. Examples of surrounding situation around the host vehicle that the surrounding situation sensor 2 can detect include stationary objects (obstacles) such as buildings, walls, poles, traffic signs, other vehicles, and bicycles, white lines on roads, and characteristic points (landmarks) such as parking frames. While the first embodiment illustrates the surrounding situation sensor 2 including a camera 2a and a laser radar 2b, the type and number of the surrounding situation sensor 2 are not limited to this illustration.

The vehicle condition sensor 3 includes a wheel velocity sensor 3a and a yaw rate sensor 3b. The wheel velocity sensor 3a detects a velocity of the wheels of the host vehicle, and outputs the detected wheel velocity as odometry information to the control device 1. The yaw rate sensor 3b detects a rate of change of a yaw angle (a yaw rate) of the host vehicle, and outputs the detected yaw rate as odometry information to the control device 1.

The input device 4 receives various kinds of instruction information from an occupant. The input device 4 may be a touch panel, switches, or buttons of the presentation device 6. The input device 4 may be switches or buttons provided on a center console, for example separately from the presentation device 6. Alternatively, the input device 4 may be a voice input device.

The storage device 5 may be any of a semiconductor storage device, a magnetic storage device, and an optical storage device, and may include a register and a cache memory. The storage device 5 may be installed in the control device 1.

The presentation device 6 may be a navigation device equipped with a display such as a liquid crystal display. The presentation device 6 is installed at a position inside the passenger compartment of the vehicle, such as an instrument panel, so that the occupant can easily recognize the presentation device 6 visually.

The control device 1 is a controller such as an electronic control unit (ECU), which may be a computer including a central processing unit (CPU) and a storage device or a processor equivalent to the computer. The control device 1 may include a programmable logic device (PLD) such as a field-programmable gate array (FPGA), or may be a functional logic circuit arranged in a general-purpose semiconductor integrated circuit.

The parking assistance device according to the first embodiment of the present invention learns surrounding situation of a parking target position detected by the surrounding situation sensor 2 during single parking or multiple parking, and stores the surrounding situation in the storage device 5. As used herein, the term "single parking" refers to an operation until the host vehicle reaches the parking target position, for example. The term "single parking" also includes an operation that the host vehicle travels around the parking target position and an operation that the host vehicle turns the steering wheel in one direction and the other direction around the parking target position before the host vehicle reaches the parking target position under the condition that the surrounding situation sensor 2 can detect the surrounding situation of the parking target position.

As used herein, the term "multiple parking" refers to a state of repeating the single parking, but the timing of repetition may include any case, such as a case of repeating parking immediately after the first parking and a case of parking on the following day after the first parking. The multiple parking may include operations of parking in the same manner or operations of parking in different manners. For example, the first parking of two parking operations may be an operation of reaching the parking target position, and the second parking may be an operation of traveling around the parking target position. The first embodiment of the present invention is illustrated with the case of single parking.

The surrounding situation of the parking target position stored in the storage unit 5 as learned results obtained by the parking assistance device according to the first embodiment of the present invention can be referred to during the subsequent or later parking. The "subsequent or later parking" may be performed at any timing, such as a point of time immediately after learning the surrounding situation of the parking target position or on the following or later day after learning the surrounding situation of the parking target position. The parking operation of the "subsequent or later parking" includes an operation of aiming for the parking target position, such as an operation that the host vehicle reaches the parking target position and an operation that the host vehicle travels around the parking target position.

Figure 2A:
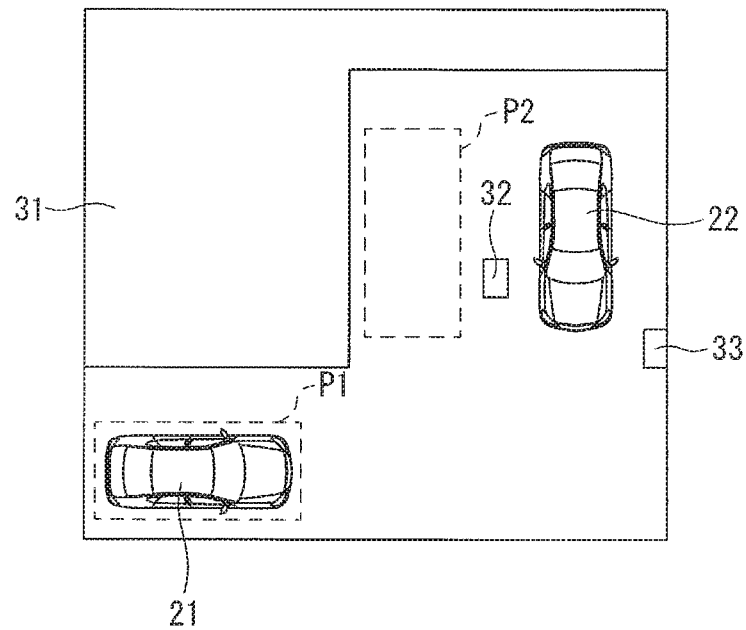
FIG. 2A is a schematic diagram showing a circumference of a parking target position according to the first embodiment of the present invention.

A method of learning the surrounding situation of the parking target position is illustrated below with reference to FIG. 2A and FIG. 2B. FIG. 2A illustrates a case in which the host vehicle 21 located at a position P1 which is a vehicle start position is parking at a parking target position P2. An obstacle 31 which is a building, obstacles 32 and 33 which are pillars of a garage, and another vehicle 22 parked in the garage exists around the parking target position P2. The occupant inputs the information of the parking start position P1 via the input device 4. The occupant then starts moving from the parking start position P1 to park the host vehicle 21 at the parking target position P2, as indicated by the arrows of the dashed lines in FIG. 2B. The surrounding situation sensor 2 detects the surrounding situation including the obstacles 31, 32, and 33 around the parking target position P2 during parking. When the parking at the parking target position P2 is completed, the occupant inputs the information of the parking target position P2 to the control device 1 via the input device 4. The occupant may park the host vehicle 21 manually, or the parking assistance device may control to park the host vehicle 21.

The control device 1 illustrated in FIG. 1 functionally includes a map generation unit 11, a presentation control unit 12, a determination unit 13, and a parking assist unit 14. The map generation unit 11 generates an environment map (environment map data) including the surrounding situation of the parking target position, in accordance with the surrounding situation of the parking target position detected by the surrounding situation sensor 2, and stores the generated environment map in the storage device 5. For example, the map generation unit 11 generates the environment map based on the surrounding situation detected by the surrounding situation sensor 2 and the odometry information such as a wheel velocity and a yaw rate detected by the vehicle condition sensor 3.

Figure 2B:
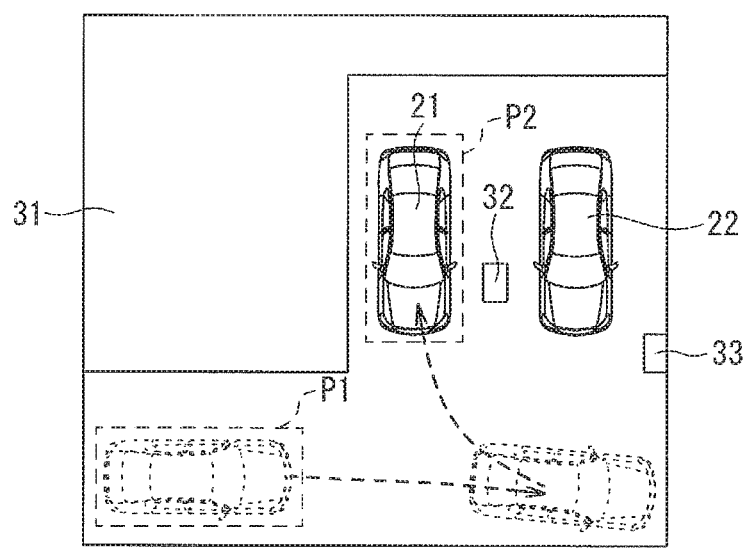
FIG. 2B is a schematic diagram showing a state of parking at the parking target position.
Figure 3:
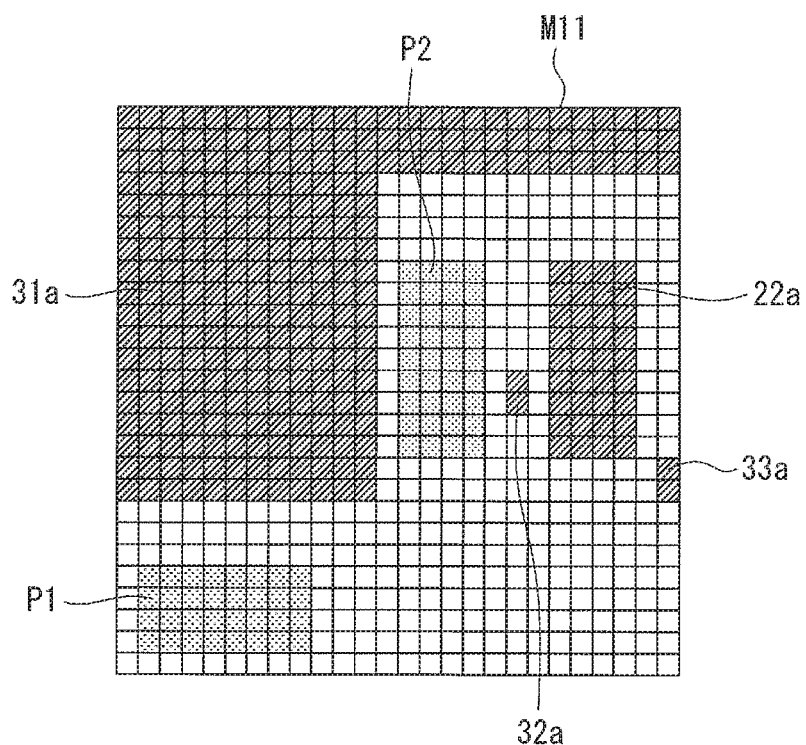
FIG. 3 is a schematic diagram illustrating an environment map according to the first embodiment of the present invention.

FIG. 3 illustrates an environment map M11 generated by the map generation unit 11 corresponding to a circumferential region of the parking target position P2 illustrated in FIG. 2A and FIG. 2B. The environment map M11 includes obstacles 31a, 32a, and 33a existing around the parking target position P2. The obstacles 31a, 32a, and 33a on the environment map M11 respectively correspond to the obstacles 31, 32, and 33 illustrated in FIG. 2A and FIG. 2B. The environment map M11 illustrated in FIG. 3 is a spatial map composed of a plurality of dots, but may be any map, such as an orthoscopic image subjected to orthoscopic correction by connecting bird's-eye view images, for example.

The map generation unit 11 sets the parking start position P1 on the environment map M11 in accordance with the information of the parking start position P1 input via the input device 4, and stores the set parking start position P1 in the storage device 5. The map generation unit 11 also sets the parking target position P2 on the environment map M11 in accordance with the information of the parking target position P2 input via the input device 4, and stores the set parking target position P2 in the storage device 5.

Figure 4A:
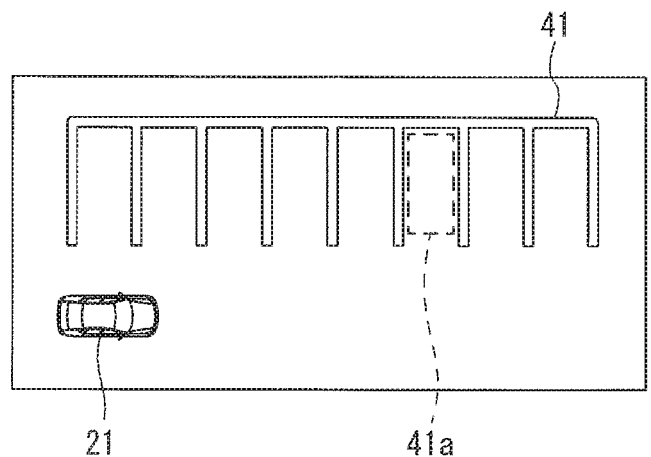
FIG. 4A is a schematic diagram showing a circumference of a parking target position according to a comparative example.
Figure 4B:
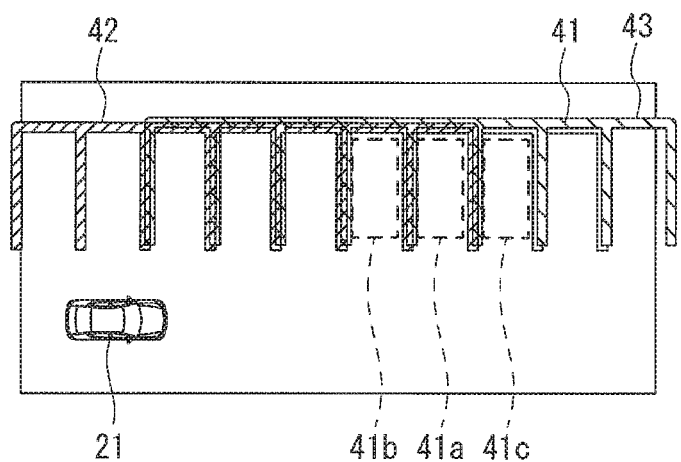
FIG. 4B is a schematic diagram showing a state in which an environment map cannot be generated correctly.

FIG. 4A illustrates a case in which parking frames 41 are arranged in the same manner at regular intervals in a parking space in an apartment building or a commercial facility, for example, and an environment map is generated during parking at a parking target position 41a. If the distance and arrangement between the parking frames 41 are stored to generate the environment map by use of the method disclosed in Patent Document 1, the environment map may result in a local solution as illustrated in FIG. 4*b*, for example, since the parking frames 41 are arranged in the same manner at the regular intervals, causing the environment map indicating parking frames 42 and 43 shifted from the actual parking frame 41. As a result, parking target positions 41*b* and 41*c* shifted from an actual parking target position 41*a* may be set. The same problem may occur when the occupant wrongly parks the host vehicle in a parking frame different from the parking target position 41*a* illustrated in FIG. 4A.

The presentation control unit 12 illustrated in FIG. 1 causes the presentation device 6 to present the surrounding situation of the parking target position detected by the surrounding situation sensor 2, so as to request the occupant to input appropriateness or inappropriateness of the surrounding situation of the parking target position detected by the surrounding situation sensor 2. For example, the presentation control unit 12 causes the presentation device 6 to present the environment map M11 including the parking start position P1 and the parking target position P2 illustrated in FIG. 3, as an example of the surrounding situation of the parking target position detected by the surrounding situation sensor 2, so as to request the occupant to input the appropriateness or inappropriateness of the environment map M11 including the parking start position P1 and the parking target position P2. The presentation control unit 12 may urge the occupant to input the appropriateness or inappropriateness by presenting text information or voice information, such as "Are the surrounding situation of the parking target position correct?" or "Please input the appropriateness or inappropriateness of the surrounding situation of the parking target position" simultaneously with the presentation of the surrounding situation of the parking target position on the presentation device 6.

The input device 4 receives the input of appropriateness or inappropriateness of the surrounding situation of the parking target position from the occupant when the surrounding situation of the parking target position are presented in the presentation device 6. The occupant visually checks the environment map M11 including the parking start position P1 and the parking target position P2 presented in the presentation device 6, and determines the appropriateness or inappropriateness of the environment map M11 (such as the presence or absence of obstacles 31*a*, 32*a*, and 33*a* or another vehicle 22*a* in the environment map M11, or the appropriateness or inappropriateness of the positions of these objects), the appropriateness or inappropriateness of the parking start position P1, and the appropriateness or inappropriateness of the parking target position P2. When the occupant determines that at least one of the environment map M11, the parking start position P1, and the parking target position P2 is not appropriate, the occupant inputs the determination of inappropriateness via the input device 4. When the occupant determines that the environment map M11, the parking start position P1, and the parking target position P2 are all appropriate, the occupant inputs the determination of appropriateness via the input device 4.

The determination unit 13 determines the appropriateness or inappropriateness of the surrounding situation of the parking target position detected by the surrounding situation sensor 2 in accordance with the determination of appropriateness or inappropriateness input by the occupant via the input device 4. When the determination of appropriateness is input by the occupant, the determination unit 13 determines that the surrounding situation of the parking target position detected by the surrounding situation sensor 2 are appropriate to be referred to during the autonomous parking, so as to use and store the surrounding situation in the storage device 5 as data to be referred to during the autonomous parking. For example, the determination unit 13 may directly store, in the storage device 5, the data of the surrounding situation of the parking target position detected by the surrounding situation sensor 2. Alternatively, the determination unit 13 may store, in the storage device 5, the environment map M11 including the parking start position P1 and the parking target position P2 as the surrounding situation of the parking target position detected by the surrounding situation sensor 2.

When the determination of inappropriateness is input by the occupant, the determination unit 13 determines that the surrounding situation of the parking target position detected by the surrounding situation sensor 2 are not appropriate to be referred to during the autonomous parking, and does not use or store the surrounding situation in the storage device 5 as data to be referred to during the autonomous parking. The determination unit 13 may simultaneously causes the presentation device 6 to present that the surrounding situation of the parking target position should be learned again, or the environment map M11 including the parking start position P1 and the parking target position P2 should be edited, for example.

The parking assist unit 14 reads out the data of the surrounding situation of the parking target position stored in the storage device 5 during the subsequent or later parking at the parking target position, and executes the autonomous parking using the data of the surrounding situation of the parking target position. For example, the parking assist unit 14 estimates (initializes) the position of the host vehicle 21 on the environment map M11 in accordance with the instruction information input by the occupant via the input device 4. The parking assist unit 14 generates a target route for parking at the parking target position P2 starting from the estimated position of the host vehicle 21 on the environment map M11. The parking assist unit 14 outputs a control signal for executing the autonomous parking along the generated target route to various types of actuators in the host vehicle 21. The parking assist unit 14 may be provided as a parking assistance device separately from the control device 1.

A parking assistance method according to the first embodiment of the present invention is illustrated below with reference to the flowchart in FIG. 5.

In step S11, the map generation unit 11 determines whether the host vehicle reaches the parking start position in accordance with the instruction information input by the occupant via the input device 4, and the process proceeds to step S12 when the host vehicle is determined to reach the parking start position. Instead of the instruction of the occupant via the input device 4, a navigation device such as the presentation device 6 may preliminarily store the positional information of the parking target position, so that the map information unit 11 determines whether the host vehicle reaches the parking start position with reference to the positional information of the host vehicle obtained by a GPS signal, for example, to present the determination result to the occupant. For example, the host vehicle is determined to reach the parking start position when the host vehicle enters a region at a predetermined direct distance from the parking target position.

In step S12, the occupant starts manual parking at the parking target position from the parking start position. The parking operation may be controlled by use of a conventional parking assistance device using bird's-eye view images. The surrounding situation sensor 2 detects surrounding situation of the parking target position including obstacles and characteristic points existing around the parking target position. The vehicle condition sensor 3 detects odometry information including a wheel velocity pulse and a yaw rate.

In step S13, the map generation unit 11 determines whether the host vehicle reaches the parking target position and completes the parking in accordance with a gearshift operation or a parking brake operation made by the occupant. When the host vehicle is determined to complete the parking, the process proceeds to step S14.

In step S14, the map generation unit 11 generates the environment map including objects around the parking target position based on the odometry information detected by the vehicle condition sensor 3 while moving the positional information of the objects and characteristic points of the surrounding situation detected by the surrounding situation sensor 2, and stores the environment map in the storage device 5. The presentation control unit 12 causes the presentation device 6 to present the surrounding situation of the parking target position such as the environment map generated by the map generation unit 11. The input device 4 receives the input of determination of whether the surrounding situation of the parking target position are appropriate when the surrounding situation of the parking target position are presented in the presentation device 6. The occupant inputs the determination of appropriateness or inappropriateness of the surrounding situation of the parking target position presented in the presentation device 6 via the input device 4.

In step S15, the determination unit 13 determines whether the surrounding situation of the parking target position detected by the surrounding situation sensor 2 are appropriate to be referred to during the autonomous parking in accordance with the determination of appropriateness or inappropriateness input by the occupant via the input device 4. When the determination of appropriateness is input by the occupant, the determination unit 13 determines that the surrounding situation of the parking target position detected by the surrounding situation sensor 2 are appropriate to be referred to during the autonomous parking, and the process proceeds to step S16. In step S16, the determination unit 13 uses and stores the surrounding situation in the storage device 5 as data (learned results) to be referred to during the autonomous parking.

When the determination of inappropriateness is input by the occupant in step S15, the determination unit 13 determines that the surrounding situation of the parking target position detected by the surrounding situation sensor 2 are not appropriate to be referred to during the autonomous parking, and the process proceeds to step S17. In step S17, the determination unit 13 does not use or store the surrounding situation in the storage device 5 as data (learned results) to be referred to during the autonomous parking.

The parking assist program according to the first embodiment of the present invention is executed by the computer composing the control device 1 through the process of the parking assistance method illustrated in FIG. 5. The parking assist program according to the first embodiment of the present invention may be stored in the storage device 5, for example.

According to the first embodiment of the present invention, the surrounding situation of the parking target position detected by the surrounding situation sensor 2, such as the environment map, are presented by the presentation device 6 when storing the surrounding situation of the parking target position and executing the autonomous parking using the surrounding situation of the parking target position stored. The surrounding situation of the parking target position are stored when the occupant determines that the surrounding situation of the parking target position presented are appropriate. The surrounding situation of the parking target position appropriate to be referred to during the autonomous parking thus can be stored. Accordingly, the autonomous parking can be executed with a high accuracy by use of the stored surrounding situation of the parking target position.

Since the surrounding situation including the parking target position are presented to the occupant when the environment map showing the surrounding situation of the parking target position detected by the surrounding situation sensor 2 is presented by the presentation device 6, the occupant can easily recognize the positional relationship between the parking target position and obstacles existing around the parking target position when inputting the appropriateness or inappropriateness of the surrounding situation presented.

A first modified example of the first embodiment of the present invention is illustrated with a case in which the presentation control unit 12 indicates, in addition to the parking target position, parking target position alternatives different from the parking target position in the environment map generated by the map generation unit 11 as the surrounding situation of the parking target position detected by the circumferential sensor 2.

Figure 6:
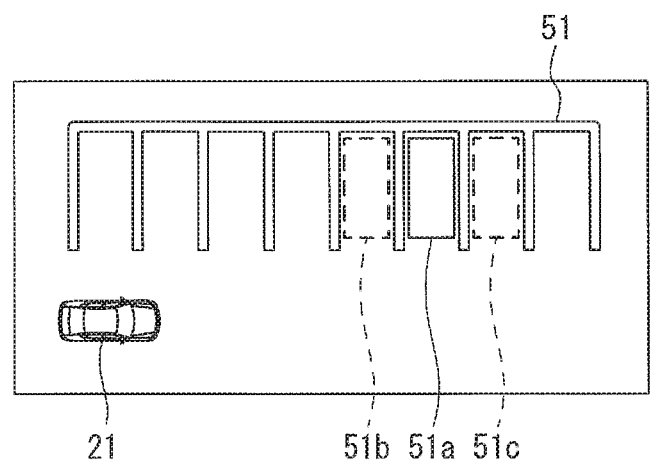
FIG. 6 is a schematic diagram illustrating an environment map according to a first modified example of the first embodiment of the present invention.

As illustrated in FIG. 6, the presentation control unit 12 presents the parking target position 51a and parking target position alternatives 51b and 51c different from the parking target position 51a in the environment map including parking frames 51. The parking target position alternative 51b or 51c is a position which can be a correct parking target position when the parking target position 51a is detected by the surrounding situation sensor 2 incorrectly. The parking target position 51a is presented in such a different color from the parking target position alternatives 51b and 51c so as to distinguish from each other. The occupant inputs the appropriateness or inappropriateness of the environment map including the parking frames 51 and the parking target position 51a while considering the probability that the parking target position alternative 51b or 51c can be a correct parking target position.

According to the first modified example of the first embodiment of the present invention, the surrounding situation including the parking target position alternatives 51b and 51c different from the parking target position 51a are presented to the occupant, so that the occupant can confirm the appropriateness or inappropriateness of the parking target position 51a using the parking target position alternatives 51b and 51c as reference information.

Figure 7:
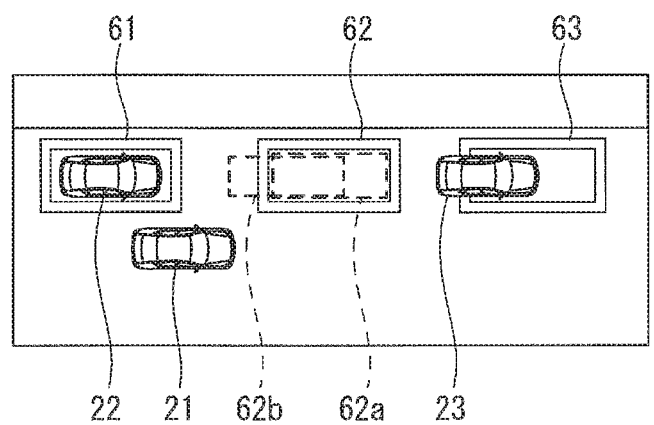
FIG. 7 is a schematic diagram showing a presentation example during autonomous parking according to a second modified example of the first embodiment of the present invention.

A second modified example of the first embodiment of the present invention is illustrated with a case of executing the autonomous parking with reference to the surrounding situation of the parking target position stored as learned results in the storage device 5. Upon the start of the autonomous parking, the presentation control unit 12 causes the presentation device 6 to present the environment map which shows the surrounding situation of the parking target position stored in the storage device 5, as illustrated in FIG. 7. The environment map includes parking frames 61, 62, and 63, and indicates the parking target position 62a partly overlapping the parking frame 62. Other vehicles 22 and 23 are parked at the parking frames 61 and 63, respectively, while the vehicle 23 is slightly displaced from the parking frame 63 toward the target parking position 62a. It is thus difficult to park the host vehicle 21 at the parking target position 62a.

The presentation control unit 12 presents a parking substitute position 62b shifted from the parking target position 62a which is a space with no obstacle so as to easily park the host vehicle 21. The occupant inputs the information of either the parking target position 62a or the parking substitute position 62b via the input device 4. The parking assist unit 14 outputs a control signal of parking the host vehicle at either the parking target position 62a or the parking substitute position 62b chosen by the occupant to various types of actuators.

According to the second modified example of the first embodiment of the present invention, the parking substitute position 62b is presented at a position adjacent to but different from the parking target position 62a, so as to request the occupant to choose either the parking target position 62a or the parking substitute position 62b to park. The parking target position 62a thus can be shifted depending on the parking circumstances. For example, when an obstacle such as a bicycle exists in the parking target position in a house lot, the parking target position is shifted while the obstacle is avoided so as to execute the autonomous parking.

A second embodiment of the present invention is illustrated with a case in which parking at a parking target position is repeated several times so as to detect (learn) surrounding situation of the parking target position several times. The detection results detected during multiple parking are integrated so as to complement obstacles and characteristic points that cannot be detected by single parking. The accuracy of map data generated according to the surrounding situation of the parking target position can be improved.

A configuration of a parking assistance device according to the second embodiment of the present invention is the same as the configuration of the parking assistance device according to the first embodiment of the present invention, including the control device (controller) 1, the surrounding situation sensor 2, the vehicle condition sensor 3, the input device (interface) 4, the storage device 5, and the presentation device 6, as illustrated in FIG. 1.

The surrounding situation sensor 2 detects the surrounding situation of the parking target position including obstacles and characteristic points existing around the parking target position for every parking. The vehicle condition sensor 3 detects odometry information including a wheel velocity pulse and a yaw rate for every parking.

The map generation unit 11 generates an environment map based on the surrounding situation detected by the surrounding situation sensor 2 and the odometry information including the wheel velocity pulse and the yaw rate detected by the vehicle condition sensor 3 for every parking, and stores the generated environment map in the storage device 5. The map generation unit 11 sets the parking start position P1 on the environment map M11 in accordance with the information of the parking start position P1 input via the input device 4, and stores the set parking start position P1 in the storage device 5. The map generation unit 11 also sets the parking target position P2 on the environment map M11 in accordance with the information of the parking target position P2 input via the input device 4, and stores the set parking target position P2 in the storage device 5.

The map generation unit 11 generates data of an environment map obtained by integrating a plurality of environment maps generated during multiple parking (hereinafter also referred to as an "integrated map"). A method of integrating the plural environment maps may use a least squares method so as to minimize an error between the corresponding characteristic points. Alternatively, an iterative closest point (ICP) algorithm may be used when the surrounding situation are gained as point-group information with a laser rangefinder (LRF) used as the surrounding situation sensor 2.

Figure 8:
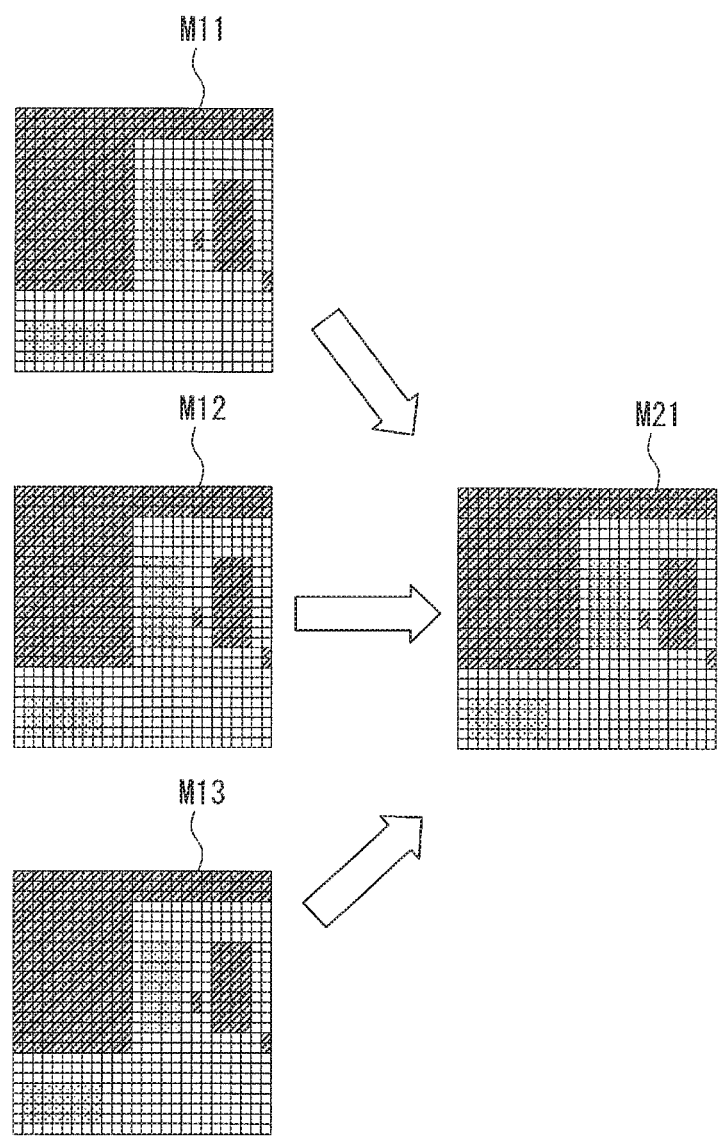
FIG. 8 is a schematic diagram illustrating a method of generating an integrated map according to a second embodiment of the present invention.

The map generation unit 11 may integrate the plural environment maps obtained during multiple parking collectively after all of parking operations are completed so as to generate the integrated map. For example, as illustrated in FIG. 8, the map generation unit 11 may integrate the environment map M11 obtained in the first parking, the environment map M12 obtained in the second parking, and the environment map M13 obtained in the third parking after the third parking is completed, so as to generate an integrated map M21. While FIG. 8 illustrates the case in which the environment maps M11, M12, and M13 and the integrated map M21 are all the same, the respective data of the environment maps M11, M12, and M13 and the integrated map M21 may be different from each other (the same can be applied to both FIG. 9 and FIG. 10).

Figure 9:
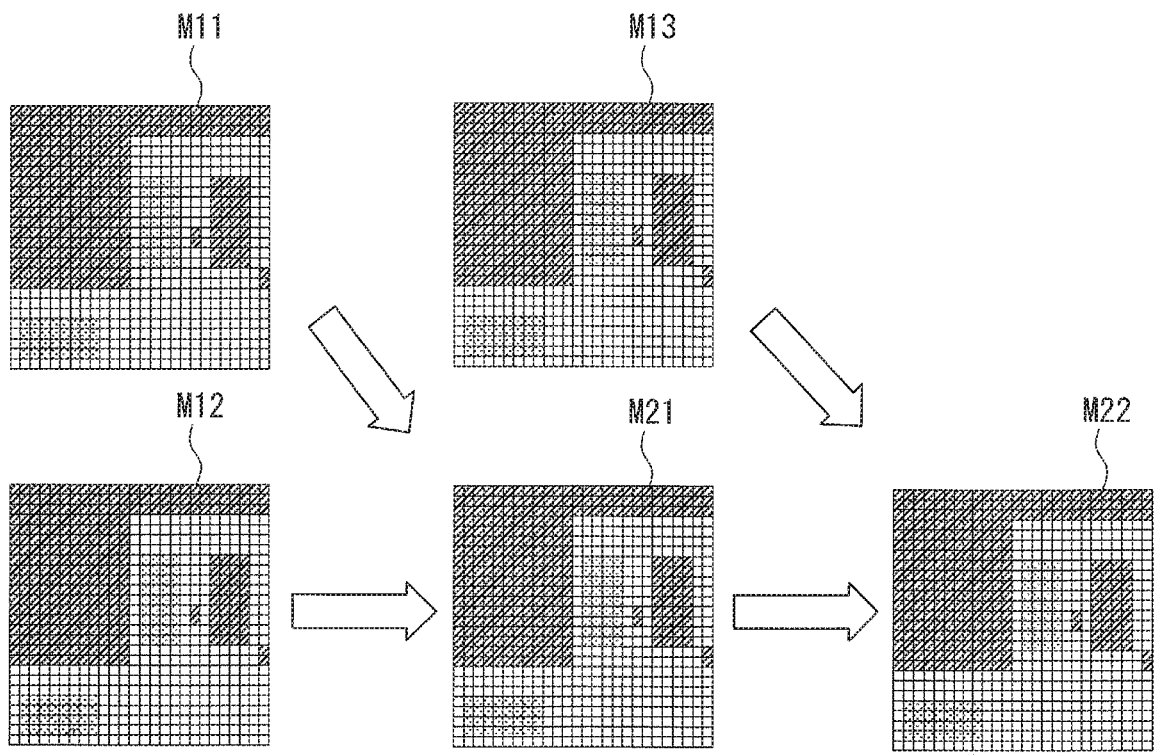
FIG. 9 is a schematic diagram illustrating another method of generating an integrated map according to the second embodiment of the present invention.

Alternatively, the map generation unit 11 may generate (update) the integrated map for every parking after the second parking. For example, as illustrated in FIG. 9, the map generation unit 11 may integrate the environment map M11 obtained in the first parking and the environment map M12 obtained in the second parking after the second parking is completed, so as to generate the first integrated map M21. The map generation unit 11 may then integrate the environment map M13 obtained in the third parking and the first integrated map M21 after the third parking is completed, so as to generate the second integrated map M22.

Figure 10:
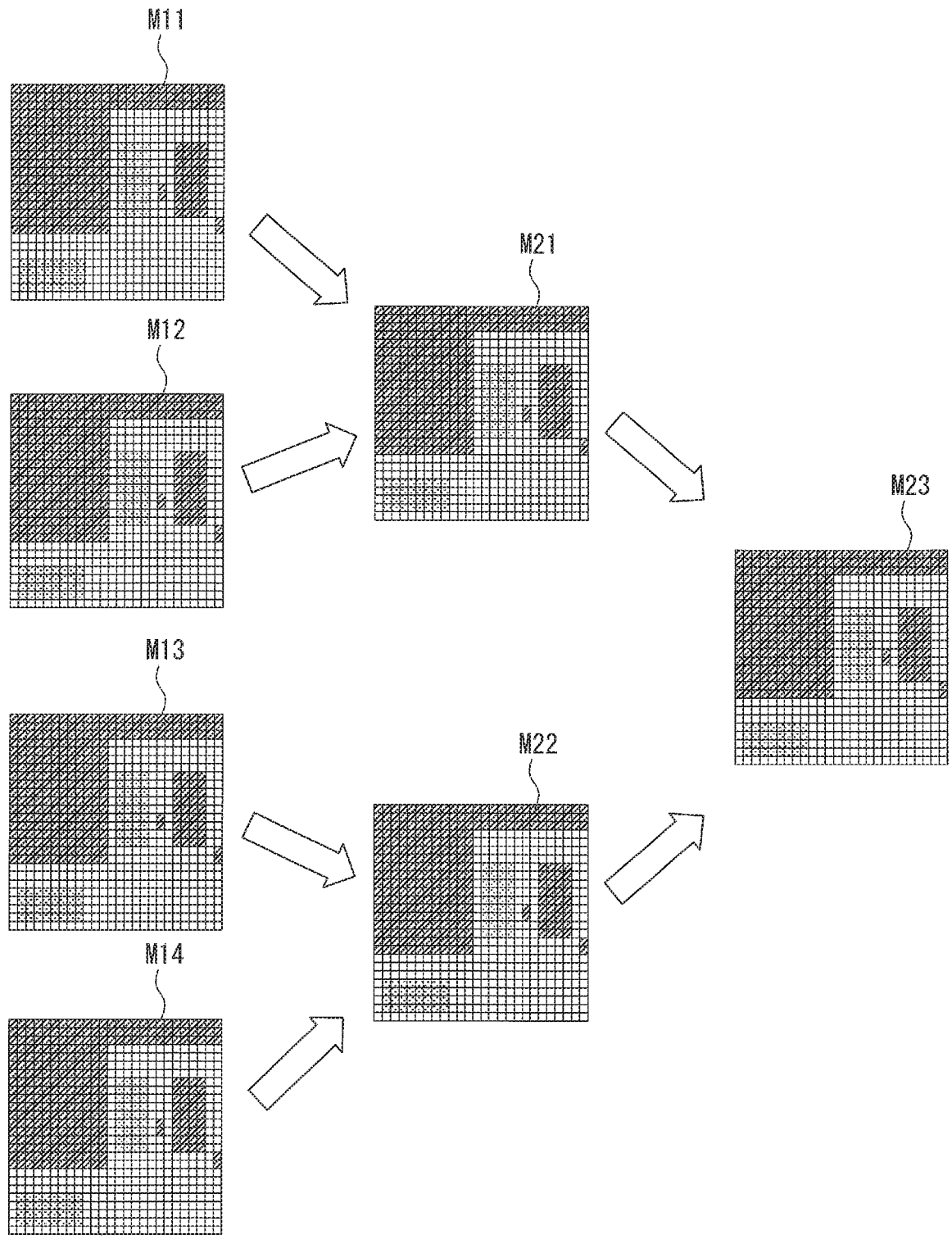
FIG. 10 is a schematic diagram illustrating another method of generating an integrated map according to the second embodiment of the present invention.

Alternatively, the map generation unit 11 may sort a plurality of environment maps into several groups and integrate the environment maps per group, so as to generate integrated maps for the respective groups. For example, as illustrated in FIG. 10, the map generation unit 11 integrates the environment map M11 obtained in the first parking and the environment map M12 obtained in the second parking as a first group so as to generate the first integrated map M21. The map generation unit 11 then integrates the environment map M13 obtained in the third parking and the environment map M14 obtained in the fourth parking as a second group so as to generate the second integrated map M22. The map generation unit 11 further integrates the first integrated map M21 and the second integrated map M22 so as to generate the third integrated map M23.

Figure 11:
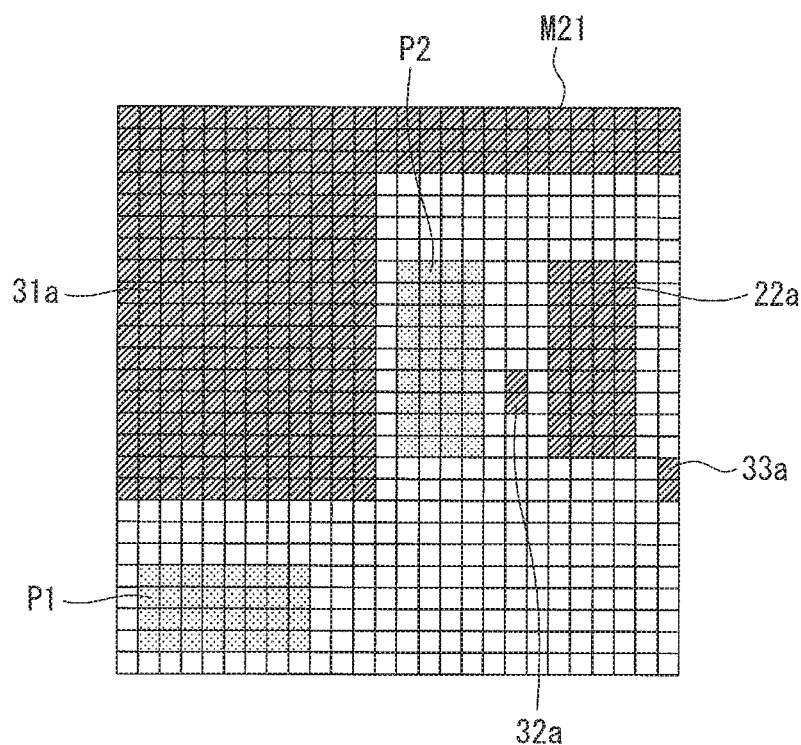
FIG. 11 is a schematic diagram illustrating an integrated map according to the second embodiment of the present invention.

FIG. 11 illustrates the integrated map M21 generated by the map generation unit 11. The integrated map M21 includes obstacles 31a, 32a, and 33a around the parking target position P2. The parking start position P1 and the parking target position P2 are set on the integrated map M21. The integrated map M21 illustrated in FIG. 11 is the same as the environment map illustrated in FIG. 3, but may be more accurate map data obtained by complementing several learned results.

The presentation control unit 12 causes the presentation device 6 to present the integrated map including the parking start position and the parking target position stored in the storage device 5, and requests the occupant to input the appropriateness or inappropriateness of the integrated map including the parking start position and the parking target position. For example, the presentation control unit 12 causes the presentation device 6 to present the integrated map M21 including the parking start position P1 and the parking target position P2 as illustrated in FIG. 11, and requests the occupant to input the appropriateness or inappropriateness of the integrated map M21 including the parking start position P1 and the parking target position P2.

When the plural environment maps M11, M12, and M13 are integrated collectively after the multiple parking is completed so as to generate the integrated map M21, as illustrated in FIG. 8, the presentation control unit 12 presents the integrated map M21 so as to request the occupant to input the appropriateness or inappropriateness of the integrated map M21. When the first integrated map M21 and the second integrated map M22 are generated for every parking after the second parking, as illustrated in FIG. 9, the presentation control unit 12 may present the first integrated map M21 and the second integrated map M22 for every parking after the second parking so as to request the occupant to input the appropriateness or inappropriateness of the integrated map M21 and the second integrated map M22 every time the respective integrated maps are generated. Alternatively, the presentation control unit 12 may present only the second integrated map M22 finally generated without presenting the first integrated map M21, so as to request the occupant to input the appropriateness or inappropriateness of only the second integrated map M22.

When the first integrated map M21 and the second integrated map M22 are generated per group, and the first integrated map M21 and the second integrated map M22 are then integrated together to generate the third integrated map M23, as illustrated in FIG. 10, the presentation control unit 12 may present the first integrated map M21, the second integrated map M22, and the third integrated map M23 every time the respective integrated maps are generated so as to request the occupant to input the appropriateness or inappropriateness of each of the first integrated map M21, the second integrated map M22, and the third integrated map M23. Alternatively, the presentation control unit 12 may present only the third integrated map M23 finally generated without presenting the first integrated map M21 or the second integrated map M22, so as to request the occupant to input the appropriateness or inappropriateness of only the third integrated map M23.

The input device 4 receives the input of determination of whether the surrounding situation of the parking target position are appropriate from the occupant when the surrounding situation of the parking target position are presented in the presentation device 6. For example, when the integrated map M21 illustrated in FIG. 11 is presented in the presentation device 6, and when the occupant determines that at least one of the presented integrated map M21 itself (namely, the presence or absence or positions of the obstacles 31a, 32a, and 33a and the other vehicle 22a in the integrated map M21), the parking start position P1 on the integrated map M21, and the parking target position P2 on the integrated map M21 is not appropriate, the occupant inputs the determination of inappropriateness via the input device 4. When the occupant determines that the presented integrated map M21 itself, the parking start position P1 on the integrated map M21, and the parking target position P2 on the integrated map M21 are all appropriate, the occupant inputs the determination of appropriateness via the input device 4.

The determination unit 13 determines the appropriateness or inappropriateness of the integrated map M21 in accordance with the determination of appropriateness or inappropriateness input by the occupant via the input device 4. When the determination of appropriateness is input by the occupant, the determination unit 13 determines that the integrated map M21 is appropriate, so as to use and store the integrated map M21 in the storage device 5 as data to be referred to during the autonomous parking. When the determination of inappropriateness is input by the occupant, the determination unit 13 determines that the integrated map M21 is not appropriate, and does not use or store the integrated map M21 in the storage device 5 as data to be referred to during the autonomous parking.

The parking assist unit 14 reads out the data of the surrounding situation of the parking target position stored in the storage device 5 during the subsequent or later parking at the parking target position, and executes the autonomous parking using the data of the surrounding situation of the parking target position.

The presentation control unit 12 may causes the presentation device 6 to present the environment map generated by the map generation unit 11 for every parking, so as to request the occupant to input the determination of appropriateness or inappropriateness of each environment map. The input device 4 may receive the input of appropriateness or inappropriateness of the environment map from the occupant for every parking when the environment map is presented in the presentation device 6. The determination unit 13 may determine the appropriateness or inappropriateness of the environment map for every parking in accordance with the determination of appropriateness or inappropriateness input by the occupant via the input device 4. When the determination of appropriateness is input by the occupant, the determination unit 13 determines that the environment map is appropriate, so as to store the environment map in the storage device 5. When the determination of inappropriateness is input by the occupant, the determination unit 13 determines that the environment map is not appropriate, and does not store the environment map in the storage device 5.

A parking assistance method according to the second embodiment of the present invention is illustrated below with reference to the flowchart in FIG. 12.

In step S21, the map generation unit 11 determines whether the host vehicle reaches the parking start position in accordance with the instruction information input by the occupant via the input device 4, and the process proceeds to step S22 when the host vehicle is determined to reach the parking start position.

In step S22, the occupant starts manual parking at the parking target position from the parking start position. The parking operation may be controlled by use of a conventional parking assistance device using bird's-eye view images. The surrounding situation sensor 2 detects obstacles and characteristic points around the parking target position. The vehicle condition sensor 3 detects odometry information including a wheel velocity pulse and a yaw rate.

In step S23, the map generation unit 11 determines whether the host vehicle reaches the parking target position and completes the parking in accordance with a gearshift operation or a parking brake operation made by the occupant. When the host vehicle is determined to complete the parking, the process proceeds to step S24.

In step S24, the map generation unit 11 generates an environment map (a display image) including the parking start position and the parking target position based on the surrounding situation detected by the surrounding situation sensor 2 and the odometry information detected by the vehicle condition sensor 3.

In step S25, the map generation unit 11 determines whether the parking executed in step S21 to step S23 is the first parking at the same parking target position. When the parking is determined to be the first parking, the process ends because the map generation unit 11 cannot generate an integrated map since there is only one environment map generated this time. When the parking is determined not to be the first parking in step S25, the process proceeds to step S26.

In step S26, the map generation unit 11 determines whether the detection (learning) of the surrounding situation of the parking target position is sufficient. For example, the map generation unit 11 determines that the detection of the surrounding situation is sufficient when the number of parking (the number of learning) at the same parking target position is a threshold which is three or more, and determines that the detection of the surrounding situation is not sufficient when the number of parking is less than three. Alternatively, the map generation unit 11 may determine that the detection of the surrounding situation is sufficient when the probability of presence of obstacles in the surrounding situation of the parking target position is a threshold or greater, and determine that the detection of the surrounding situation is not sufficient when the probability of presence of obstacles is less than the threshold. The process may proceed to step S27 without executing the determination of whether the detection of the surrounding situation is sufficient in step S26.

In step S27, the presentation control unit 12 present, on the presentation device 6, the environment map (the display image) including the parking start position and the parking target position generated by the map generation unit 11, and requests the occupant to input the appropriateness or inappropriateness of the display image. The occupant visually checks the display image presented in the presentation device 6 and inputs the appropriateness or inappropriateness of the display image via the input device 4. When the occupant determines that the presence or absence or positions of the obstacles, the parking start position, or the parking target position in the display image is not correct, the occupant inputs the determination that the display image is not appropriate via the input device 4. When the occupant determines that the presence or absence or positions of the obstacles, the parking start position, and the parking target position in the display image are correct, the occupant inputs the determination that the display image is appropriate via the input device 4.

In step S28, the determination unit 13 determines the appropriateness or inappropriateness of the environment map generated by the map generation unit 11 in accordance with the determination of appropriateness or inappropriateness of the display image input by the occupant via the input device 4. When the determination of appropriateness is input by the occupant, the determination unit 13 determines that the environment map generated by the map generation unit 11 is appropriate, and the process proceeds to step S29.

In step S29, the map generation unit 11 generates an environment map (an integrated map) obtained by integrating a plurality of environment maps including the environment map generated by the map generation unit 11 during the current parking, by use of a least squares method or an ICP algorithm. For example, when the current parking is the third parking, the environment map obtained in the first parking and the environment map obtained in the second parking stored in the storage device 5 are integrated with the environment map obtained during the current (third) parking, so as to generate the integrated map. Alternatively, when the environment map obtained in the first parking and the environment map obtained in the second parking are integrated together and stored in the storage device 5 as the first integrated map, the first integrated map and the environment map obtained during the current (third) parking are integrated together so as to generate the second integrated map. The integrated map generated by the map generation unit 11 is used as map data to be referred to during the autonomous parking and stored in the storage device 5.

When the determination of inappropriateness is input by the occupant in step S28, the determination unit 13 determines that the display image generated by the map generation unit 11 is not appropriate, and the process proceeds to step S30. In step S30, the determination unit 13 does not use the environment map generated by the map generation unit 11 or generate an integrated map obtained by integrating the environment maps.

Figure 12:
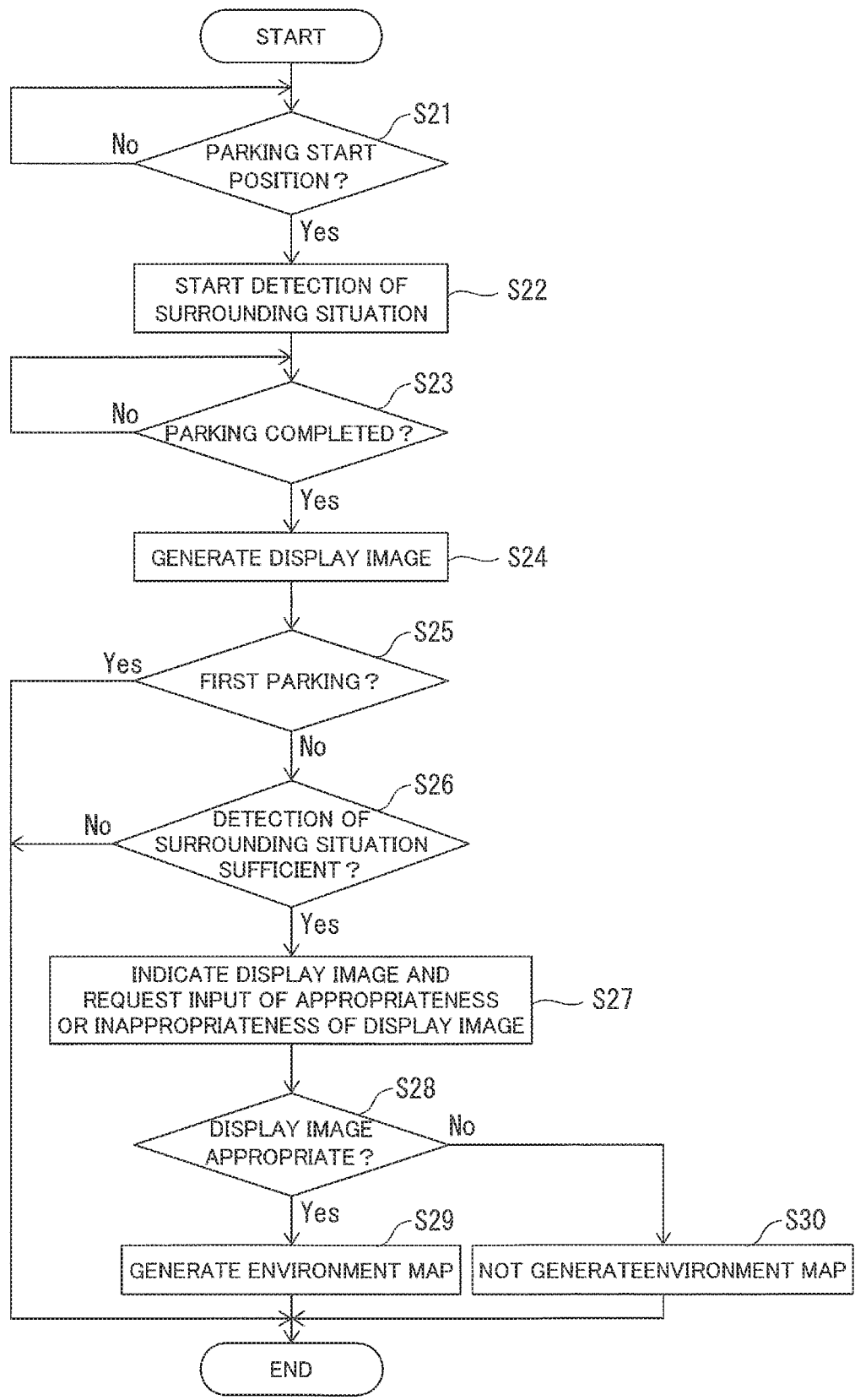
FIG. 12 is a flowchart illustrating a parking assistance method according to the second embodiment of the present invention.

The parking assist program according to the second embodiment of the present invention is executed by the computer composing the control device 1 through the process of the parking assistance method illustrated in FIG. 12. The parking assist program according to the second embodiment of the present invention may be stored in the storage device 5, for example.

The parking assistance method is illustrated in FIG. 12 with the case in which the presentation control unit 12 presents the environment map (the display image) generated by the map generation unit 11 on the presentation device 6 in step S27, but is not limited to this illustration. For example, the map generation unit 11 may generate an integrated map (a display image) obtained by integrating a plurality of environment maps before step S27, so that the presentation control unit 12 presents the integrated map (the display image) on the presentation device 6 in step S27. When the determination that the integrated map (the display image) is appropriate is input by the occupant in step S28, the process proceeds to step S29, and the determination unit 13 uses and stores the integrated map in the storage device 5 as map data to be referred to during the autonomous parking. When the determination that the integrated map (the display image) is not appropriate is input by the occupant in step S28, the determination unit 13 determines that the integrated map is not appropriate, and the process proceeds to step S30. In step S30, the determination unit 13 does not use or store the integrated map in the storage device 5 as map data to be referred to during the autonomous parking.

According to the second embodiment of the present invention, the environment map, which shows the surrounding situation of the parking target position detected by the surrounding situation sensor 2, is presented in the presentation device 6 when storing the surrounding situation of the parking target position and executing the autonomous parking using the surrounding situation of the parking target position stored. The surrounding situation of the parking target position are stored when the occupant determines that the surrounding situation of the parking target position presented are appropriate. The surrounding situation of the parking target position appropriate to be referred to during the autonomous parking thus can be stored. Accordingly, the autonomous parking can be executed with a high accuracy by use of the stored surrounding situation of the parking target position.

The parking at the parking target position is repeated to detect the surrounding situation of the parking target position several times, and the surrounding situation of the parking target position detected several times are stored, so as to integrate and complement all of the surrounding situation of the parking target position to generate the environment map with a higher accuracy.

Since the surrounding situation of the parking target position stored during multiple parking are presented to the occupant, the occupant can choose the appropriate data from the surrounding situation of the parking target position stored during multiple parking.

Since the surrounding situation of the parking target position are stored for every parking at the parking target position, the surrounding situation such as the environment map appropriate to be referred to during the autonomous parking can be chosen for every parking at the parking target position.

The surrounding situation including the parking target position are presented to the occupant when the environment map showing the surrounding situation of the parking target position detected by the surrounding situation sensor 2 is presented in the presentation device 6. The occupant thus can easily recognize the positional relationship between the parking target position and obstacles existing around the parking target position when inputting the appropriateness or inappropriateness of the surrounding situation presented.

The surrounding situation for every parking at the parking target position are presented the determination of whether the surrounding situation of the parking target position detected by the surrounding situation sensor 2 are appropriate input by the occupant is received for every parking at the parking target position, and the surrounding situation determined to be appropriate by the occupant are stored. The surrounding situation of the parking target position appropriate to be referred to during the autonomous parking selected from the surrounding situation obtained for every parking at the parking target position thus can be stored. Accordingly, the autonomous parking can be executed with a high accuracy using the surrounding situation of the parking target position stored.

The second embodiment of the present invention has been illustrated with the case in which a plurality of environment maps obtained during multiple parking are all integrated together. A modified example of the second embodiment of the present invention is illustrated with a case in which some of environment maps are selectively integrated together.

The presentation control unit 12 presents a plurality of environment maps obtained during multiple parking on the presentation device 6 simultaneously side by side or sequentially, and requests the occupant to choose the environment maps (learned results) to be integrated from the presented environment maps. The occupant visually checks the environment maps presented in the presentation device 6, so as to input instruction information of environment maps (learned results) appropriate to be integrated chosen from the presented environment maps via the input device 4. The map generation unit 11 extracts the environment maps to be integrated from the stored environment maps in accordance with the results of the environment maps to be integrated chosen by the occupant. The map generation unit 11 integrates the chosen environment maps to generate an integrated map.

According to the modified example of the second embodiment of the present invention, a plurality of environment maps obtained by repeating parking several times are presented in the presentation device 6, so as to request the occupant to choose the environment maps (leaned results) to be integrated from the presented environment maps. Accordingly, the occupant can choose environment maps appropriate to be integrated from the environment maps obtained during the respective learning, so as to selectively integrate the appropriate environment maps while eliminating inappropriate environment maps.

While the present invention has been described above with reference to the first and second embodiments, it should be understood that the present invention is not intended to be limited to the descriptions and the drawings composing part of this disclosure. Various alternative embodiments, examples, and technical applications will be apparent to those skilled in the art according to this disclosure.

While the first and second embodiments have exemplified the case in which the presentation device 6 is mainly a display, the presentation device 6 may be a device other than the display. For example, when the presentation device 6 is a speaker, the presentation device 6 may output voice for explaining the surrounding situation of the parking target position detected by the surrounding situation sensor 2, such as "The recognition rate of the surrounding situation of the parking target position is now 80%", or "The parking target position is recognized ahead", so as to present the information about the surrounding situation of the parking target position detected by the surrounding situation sensor 2 to the occupant.

It should be understood that the present invention includes various embodiments not disclosed herein. Therefore, the technical scope of the present invention is defined only by the specifying matters according to claims reasonably derived from the foregoing description.

REFERENCE SIGNS LIST

1 Control device
2 Circumferential condition sensor
2a Camera
2b Laser radar
3 Vehicle condition sensor
3a Wheel velocity sensor
3b Yaw rate sensor
4 Input device
5 Storage device
6 Indication device
11 Map generation unit
12 Indication control unit
13 Determination unit
14 Parking assist unit

The invention claimed is:

1. A parking assistance method of storing a surrounding situation including a position of an obstacle around a parking target position when parking a host vehicle at the parking target position, and executing autonomous parking using the stored surrounding situation including the position of the obstacle, the method comprising:
  detecting the surrounding situation including the position of the obstacle;
  after the parking of the host vehicle at the parking target position has completed, indicating the detected surrounding situation including the position of the obstacle to an occupant of the host vehicle via a presentation device;
  receiving, input by the occupant, a determination of whether the indicated surrounding situation including the position of the obstacle at the parking target position was accurately detected and can be used for subsequent or later autonomous parking;
  in response to receiving an indication input by the occupant that the indicated surrounding situation including the position of the obstacle at the parking target position was accurately detected and can be used for the subsequent or later autonomous parking, storing the indicated surrounding situation including the position of the obstacle that was detected prior to receiving the determination; and executing the autonomous parking using the surrounding situation including the position of the obstacle previously stored during the subsequent or later parking of the host vehicle and after learning the surrounding situation including the position of the obstacle.

2. The parking assistance method of claim 1, wherein:
detecting the surrounding situation repeatedly detects surrounding situation during multiple parking at the parking target position; and
storing the surrounding situation stores the surrounding situation detected during the multiple parking.

3. The parking assistance method of claim 2, wherein the indicating the surrounding situation indicates the stored surrounding situation detected during the multiple parking.

4. The parking assistance method of claim 2, wherein the storing the surrounding situation stores the surrounding situation for every parking at the parking target position.

5. The parking assistance method of claim 2, wherein:
indicating the surrounding situation indicates the surrounding situation for every parking at the parking target position;
receiving the determination input by the occupant receives from the occupant a determination of whether the indicated surrounding situation can be used for subsequent or later autonomous parking for every parking at the parking target position; and
storing the surrounding situation stores the surrounding situation determined to be appropriate by the occupant.

6. The parking assistance method of claim 1, wherein the indicating the surrounding situation indicates the surrounding situation including the parking target position.

7. The parking assistance method of claim 1, wherein the indicating the surrounding situation indicates the surrounding situation including a parking target position alternative at a position different from the parking target position.

8. The parking assistance method of claim 1, wherein the occupant determines that the detected surrounding situation is appropriate for autonomous parking when the detected surrounding situation indicated via the presentation device matches with a perceived surrounding situation experienced by the occupant.

9. The parking assistance method of claim 1, further comprising:
in response to receiving an indication surrounding situation including the position of the obstacle at the parking target position cannot be used for the subsequent or later autonomous parking, ignoring or discarding the indicated surrounding situation including the position of the obstacle at the parking target position.

10. A parking assistance device configured to store a surrounding situation including a position of an obstacle around a parking target position when parking a host vehicle at the parking target position, and execute autonomous parking using the stored surrounding situation including the position of the obstacle, the device comprising:
a surrounding situation sensor configured to detect the surrounding situation including the position of the obstacle;
a presentation device configured to indicate the detected surrounding situation including the position of the obstacle to an occupant of the host vehicle after the parking of the host vehicle at the parking target position has completed;
an interface configured to receive, from the occupant, an indication of whether the indicated surrounding situation including the position of the obstacle at the parking target position was accurately detected and can be used for subsequent or later autonomous parking; and
a controller configured to store the indicated surrounding situation including the position of the obstacle at the parking target position in response to receiving from the occupant an indication that the indicated surrounding situation including the position of the obstacle was accurately detected and can be used for the subsequent or later parking, and execute the autonomous parking using the surrounding situation including the position of the obstacle previously stored during the subsequent or later autonomous parking of the host vehicle.

11. A parking assistance method, comprising:
detecting a surrounding situation of a parking target position;
before or during a parking of a host vehicle at the parking target position, generating an environmental map around the parking target position using the detected surrounding situation;
during or after the parking of the host vehicle at the parking target position, indicating the generated environmental map to an occupant of the host vehicle via a presentation device;
receiving, input by the occupant of the host vehicle, an indication of whether the indicated environmental map was accurately detected and can be stored for subsequent autonomous parking at the parking target position;
in response to receiving from the occupant of the host vehicle an indication that the indicated environmental map was accurately detected, storing the indicated environmental map; and
after storing the indicated environmental map, performing the autonomous parking at the parking target position using the stored environmental map during a subsequent visit to the parking target position.

12. The parking assistance method of claim 11, where performing the autonomous parking comprises:
estimating a position of a host vehicle on the stored environmental map;
generating a target route for parking at the parking target position starting from the estimated position of the host vehicle using the environmental map; and
performing the autonomous parking along the target route.

13. A parking assistance method of storing a surrounding situation including a position of an obstacle around a parking target position when parking a host vehicle at the parking target position, and executing autonomous parking using the stored surrounding situation including the position of the obstacle, the method comprising:
detecting the surrounding situation including the position of the obstacle;
indicating the detected surrounding situation including the parking target position and the position of the obstacle to an occupant of the host vehicle when the parking the host vehicle at the parking target position has completed;
receiving, from the occupant, an indication of whether a positional relationship between the parking target position and the position of the obstacle in the indicated surrounding situation were accurately detected;
storing the indicated surrounding situation including the position of the obstacle at the parking target position in response to receiving from the occupant an indication that the positional relationship between the parking target position and the position of the obstacle in the indicated surrounding situation were accurately detected; and executing the autonomous parking using the surrounding situation including the position of the obstacle previously stored during a subsequent or later autonomous parking of the host vehicle.

\* \* \* \* \*